(12) United States Patent
Lin et al.

(10) Patent No.: US 7,321,771 B2
(45) Date of Patent: Jan. 22, 2008

(54) CONTROL METHOD CAPABLE OF REDUCING CALL DROPPED RATE OF MOBILE STATION IN WIRELESS COMMUNICATION SYSTEM, CONTROL CIRCUIT AND MOBILE STATION THEREOF

(75) Inventors: Chun-Hsiung Lin, Taipei (TW); Sung-Yao Lin, Taipei (TW)

(73) Assignee: Mediatek Incorporation, Hsin-Chu Hsien (TW)

( * ) Notice: Subject to any disclaimer, the term of this patent is extended or adjusted under 35 U.S.C. 154(b) by 26 days.

(21) Appl. No.: 10/904,776

(22) Filed: Nov. 29, 2004

(65) Prior Publication Data
US 2005/0124349 A1 Jun. 9, 2005

(30) Foreign Application Priority Data
Dec. 5, 2003 (TW) .............................. 92134476 A
Aug. 3, 2004 (TW) .............................. 93123275 A

(51) Int. Cl.
*H04Q 7/20* (2006.01)
(52) U.S. Cl. ...................... 455/450; 455/437; 455/425; 455/449
(58) Field of Classification Search ................ 455/450, 455/449, 437
See application file for complete search history.

(56) References Cited

U.S. PATENT DOCUMENTS 5,267,261 A 11/1993 Blakeney, II et al.
6,101,383 A * 8/2000 Poon .......................... 455/425
2005/0048982 A1 * 3/2005 Roland et al. .............. 455/449
2005/0079870 A1 * 4/2005 Rick et al. .................. 455/437

FOREIGN PATENT DOCUMENTS

CN 1245626 A 2/2000

* cited by examiner

Primary Examiner—Lester G. Kincaid
Assistant Examiner—Charles Shedrick
(74) Attorney, Agent, or Firm—Winston Hsu

(57) ABSTRACT

A control method, capable of reducing the call dropped rate of a mobile station in a wireless communication system, includes monitoring receiving power levels of a plurality of neighbor cells of the wireless communication system according to an information of a serving cell of the wireless communication system; and if the Base Station Identification Codes (BSICs) of the six neighbor cells corresponding to the six strongest receiving power levels are known, and if the BSIC of at least one neighbor cell corresponding to at least one receiving power level other than the six strongest ones is unknown, performing frequency correction and synchronization of the mobile station with respect to the at least one neighbor cell's Broadcast Control Channel (BCCH) to decode the at least one neighbor cell's BSIC.

34 Claims, 2 Drawing Sheets

CONTROL METHOD CAPABLE OF REDUCING CALL DROPPED RATE OF MOBILE STATION IN WIRELESS COMMUNICATION SYSTEM, CONTROL CIRCUIT AND MOBILE STATION THEREOF

BACKGROUND

The present invention relates to wireless communication, and more particularly, to a control method capable of reducing the call dropped rate of a mobile station in a wireless communication system, and a control circuit and mobile station thereof.

As wireless communication system technology progresses, wireless communication and personal mobile communication have become essential in our daily life nowadays. In a wireless communication system, many different interference sources are provided, such as external interference, interference between signals of the wireless communication system itself, multi-path fading of a signal itself in the wireless communication system, Inter-Symbol Interference (ISI), and so on. Therefore, how to reduce the call dropped rate of a mobile station in the wireless communication system has become an important issue of wireless communication.

According to various standards of wireless communication, such as Global System for Mobile communication (GSM) and General Packet Radio Service (GPRS), a mobile station should monitor receiving power levels of a plurality of neighbor cells near a serving cell in the wireless communication system and maintain the Base Station Identification Codes (BSICs) of six neighbor cells corresponding to the six strongest receiving power levels. Once the wireless communication system instructs the mobile station to switch to a new serving cell being one of the six neighbor cells because of poor communication quality of the serving cell, the mobile station is capable of performing the switch accordingly to avoid call drop problems.

According to definitions of the wireless communication related specifications, while at a communicating state, the mobile station should receive a measurement result of neighbor cells from a lower layer of the mobile station every 0.5 seconds. The mobile station has to determine which six neighbor cells have the six strongest receiving power levels according to the measurement result. If in the neighbor cells corresponding to the six strongest receiving power levels, at least one (i.e. one or more) neighbor cell having unknown BSIC exists, the mobile station has to enter a priority mode M1 to perform frequency correction and synchronization of the mobile station with respect to the at least one neighbor cell's Broadcast Control Channel (BCCH) to decode the at least one neighbor cell's BSIC. In addition, according to definitions of the wireless communication related specifications, the time period in which the mobile station stays in the priority mode M1 is limited to five seconds.

After the mobile station entered the priority mode M1, if the BSICs of six neighbor cells corresponding to the six strongest receiving power levels are known or the time period in which the mobile station stays in the priority mode M1 has reached five seconds, the mobile station has to leave the priority mode M1 and enter a reconfirmation mode M2. In the reconfirmation mode M2, the mobile station will reconfirm the synchronization to all other neighbor cells having known BSICs, wherein the neighbor cells having known BSICs are not necessarily the neighbor cells having the six strongest receiving power levels. When the mobile station completes the reconfirmation of the synchronization to all the neighbor cells having known BSICs, the mobile station has to leave the reconfirmation mode M2. In addition, according to definitions of the wireless communication related specifications, the mobile station has to enter the reconfirmation mode M2 again within ten seconds.

Accordingly, if the communication quality of the serving cell is poor, the wireless communication system will select a neighbor cell with better communication quality out of the neighbor cells having known BSICs and switch the mobile station to the neighbor cell selected by the wireless communication system. That is, the neighbor cell selected by the wireless communication system will be a new serving cell of the mobile station. However, the wireless communication system can select a neighbor cell with better communication quality only out of the neighbor cells having known BSICs. Therefore, if the number of the neighbor cells having known BSICs is limited, the number of selectable neighbor cells by the mobile station is also limited. Therefore, it is very likely that even if the wireless communication system switches the mobile station to a new serving cell, the poor communication quality is not improved. In the worst case, there could be no selectable neighbor cell. As a result, the mobile station suffers from a high call dropped rate.

SUMMARY

It is therefore an objective of the present invention to provide a mobile station, a control circuit thereof, and a control method of the mobile station in a wireless communication system to increase the number of neighbor cells having known Base Station Identification Codes (BSICs). Therefore, the wireless communication system is capable of selecting a cell with better communication quality from more neighbor cells. In addition, the invention prevents the mobile station from lack of selectable neighbor cells, improves communication quality of the mobile station, and reduces the call dropped rate of the mobile station.

The present invention provides a control method capable of reducing the call dropped rate of a mobile station in a wireless communication system. The control method includes: monitoring receiving power levels of a plurality of neighbor cells of the wireless communication system according to an information of a serving cell of the wireless communication system; and if the BSICs of six neighbor cells corresponding to the six strongest receiving power levels are known, and if the BSIC of at least one neighbor cell corresponding to at least one receiving power level other than the six strongest ones is unknown, performing frequency correction and synchronization of the mobile station with respect to the at least one neighbor cell's Broadcast Control Channel (BCCH) to decode the at least one neighbor cell's BSIC.

The present invention further provides a control circuit capable of reducing the call dropped rate of a mobile station in a wireless communication system. The control circuit includes: a first module for monitoring receiving power levels of a plurality of neighbor cells of the wireless communication system according to the information of a serving cell of the wireless communication system; and a second module coupled to the first module, wherein if the BSICs of six neighbor cells corresponding to the six strongest receiving power levels are known, and if the BSIC of at least one neighbor cell corresponding to at least one receiving power level other than the six strongest ones is unknown, the second module makes the first module perform frequency correction and synchronization of the mobile station with respect to the at least one neighbor cell's BCCH to decode the at least one neighbor cell's BSIC.

The present invention further provides a mobile station including: an antenna for transmitting and receiving wireless communication signals; a first module coupled to the antenna for monitoring receiving power levels of a plurality of neighbor cells of the wireless communication system according to the information of a serving cell of the wireless communication system; and a second module coupled to the first module, wherein if the BSICs of six neighbor cells corresponding to the six strongest receiving power levels are known, and if the BSIC of at least one neighbor cell corresponding to at least one receiving power level other than the six strongest ones is unknown, the second module makes the first module perform frequency correction and synchronization of the mobile station with respect to the at least one neighbor cell's BCCH to decode the at least one neighbor cell's BSIC.

It is an advantage of the present invention that if communication quality of the serving cell is poor and the BSICs of the six neighbor cells corresponding to the six strongest receiving power levels are unexpectedly not available due to various conditions (e.g. the mobile station carried by the user thereof passes under a mountain through a tunnel and locates at another side of the mountain), the mobile station and the wireless communication system will still have the at least one neighbor cell capable of being a new serving cell. Therefore, the present invention method and related devices are capable of reducing the call dropped rate of the mobile station in the wireless communication system.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
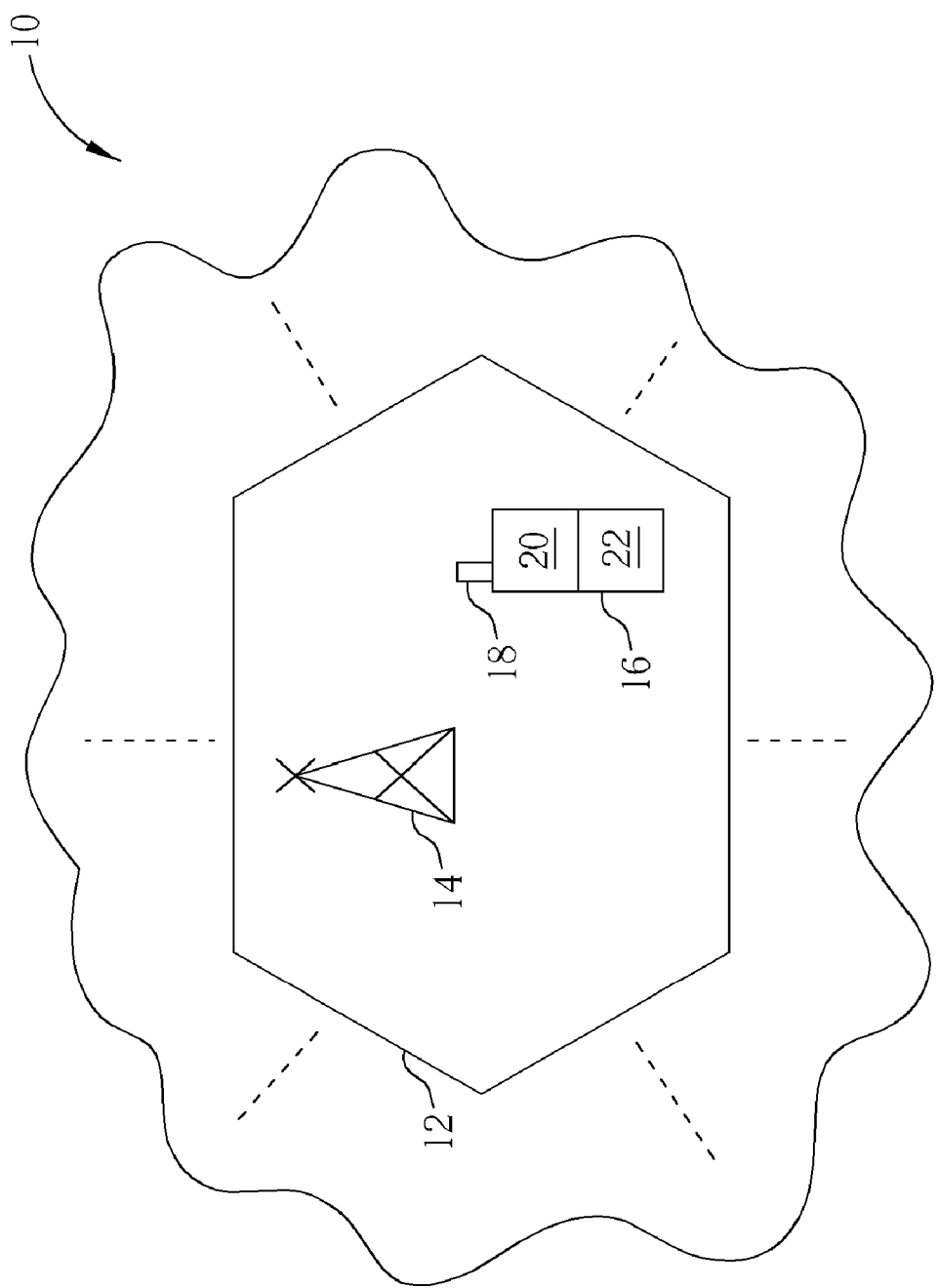
FIG. 1 is a diagram of a wireless communication system according to an exemplary of the present invention.

According to definitions of the related specifications mentioned above, when being at a communicating state, a mobile station of the present invention should receive a measurement result of neighbor cells from a lower layer of the mobile station every 0.5 seconds to determine which six neighbor cells have the strongest receiving power levels. If in the neighbor cells corresponding to the six strongest receiving power levels, at least one (i.e. one or more) neighbor cell having unknown Base Station Identification Code (BSIC)exists, the mobile station has to enter the priority mode M1. In addition, the time period in which the mobile station stays in the priority mode M1 is limited to five seconds. Furthermore, at least every ten seconds, the mobile station has to enter the reconfirmation mode M2.

That is, the mobile station has to enter the reconfirmation mode M2 for every time period within ten seconds. When completing the reconfirmation, the mobile station leaves the reconfirmation mode M2. At this situation, if in the six neighbor cells corresponding to the six strongest receiving power levels, at least one (i.e. one or more) neighbor cell having unknown BSICexists, the mobile station has to enter the priority mode M1. Please note, the time period in which the mobile station stays in the priority mode M1 is limited to five seconds and the time period in which the mobile station stays in the reconfirmation mode M2 usually will not exceed five seconds. That is, the mobile station may complete reconfirmation within five seconds, wherein the length of the time period in which the mobile station stays in the reconfirmation mode M2 depends on the number of neighbor cells. In particular, if the mobile station has enough power to decode multiple neighbor cells' BSICs and to perform reconfirmation to multiple neighbor cells at the same time, the mobile station is capable of decreasing the time period in which the mobile station stays in the priority mode M1 and the time period in which the mobile station stays in the reconfirmation mode M2. As a result, in every time period up to ten seconds, a time interval in which the mobile station stays in neither the priority mode M1 nor the reconfirmation mode M2 exists. The present invention utilizes the time interval mentioned above and controls the mobile station to enter a second priority mode M3 during the time interval. In the second priority mode M3, if the BSIC of at least one neighbor cell corresponding to at least one stronger receiving power level other than the six strongest receiving power levels is unknown, the mobile station performs frequency correction and synchronization with respect to the at least one neighbor cell's Broadcast Control Channel (BCCH) to decode the at least one neighbor cell's BSIC. As a result, the number of neighbor cells having known BSICs is increased. Therefore, a wireless communication system of the present invention is capable of selecting a neighbor cell with better communication quality from more selectable neighbor cells. Therefore, the invention prevents the mobile station from lack of selectable neighbor cells, improves communication quality of the mobile station, and reduces a call dropped rate of the mobile station.

Please refer to FIG. 1 showing a diagram of a wireless communication system 10 according to an exemplary embodiment of the present invention. In a serving area of a cell 12 shown in FIG. 1, a mobile station 16 is provided. According to the present invention, the mobile station 16 usually includes an antenna 18 for transmitting and receiving wireless communication signals; a lower layer 20 for processing data related to communication between the mobile station 16 and the base station 14 through the antenna 18; and an upper layer 22 for communicating with the base station 14 through the lower layer 20 and the antenna 18 to couple the mobile station to a network of the wireless communication system 10. Usually, the upper layer 22 includes components such as a processor and a memory. As the mobile station 16 shown in FIG. 1 is located in the serving area of the cell 12, the mobile station 16 may select the cell 12 as a serving cell as mentioned.

Figure 2:
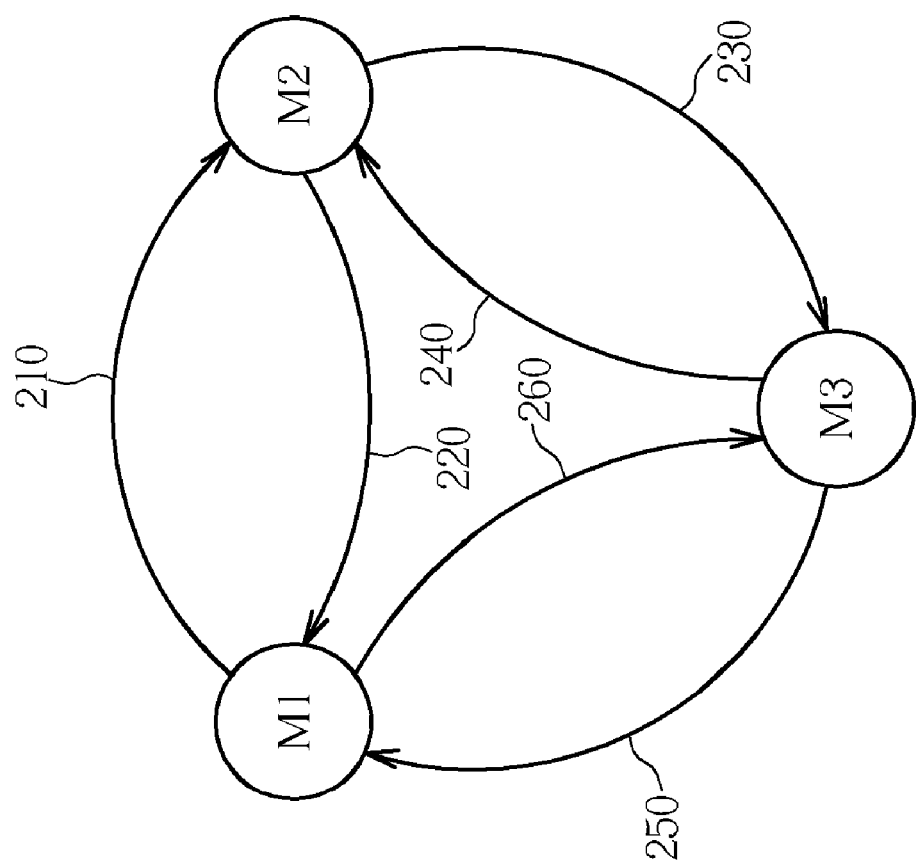
FIG. 2 is a diagram of mode switching of a control method according to an exemplary embodiment of the present invention.

The present invention provides a control method capable of reducing the call dropped rate of the mobile station 16 in the wireless communication system 10. The mobile station 16 includes the priority mode M1, the reconfirmation mode M2, and the second priority mode M3 mentioned above. Please refer to FIG. 2 showing a diagram of mode switching of the control method according to the present invention. As shown in FIG. 2, the mobile station switches among the priority mode M1, the reconfirmation mode M2, and the second priority mode M3 for every time period within ten seconds. Of course, in certain situations, the mobile station only switches between the priority mode M1 and the reconfirmation mode M2; additionally, in other situations, the mobile station only switches between the reconfirmation mode M2 and the second priority mode M3.

As mentioned above, when being at a communicating state, the mobile station 16 monitors receiving power levels of a plurality of neighbor cells near the serving cell in the wireless communication system 10. The mobile station 16 receives a measurement result of neighbor cells from the lower layer 20 every 0.5 seconds to determine which six neighbor cells have the strongest receiving power levels.

Details of how the control method of the present invention performs the mode switching are described as follows. According to the measurement result, the mobile station 16 determines which six neighbor cells have the strongest receiving power levels. If in the six neighbor cells corresponding to the six strongest receiving power levels, at least one (i.e. one or more) neighbor cell having unknown BSICexists, the mobile station 16 enters the priority mode M1. If all BSICs of six neighbor cells corresponding to the six strongest receiving power levels are known, the mobile station 16 enters the reconfirmation mode M2.

In the priority mode M1, the mobile station 16 performs frequency correction and synchronization of the mobile station 16 with respect to the at least one neighbor cell's BCCHs to decode the at least one neighbor cell's BSIC. As shown by the arrow 210 in FIG. 2, if all BSICs of six neighbor cells corresponding to the six strongest receiving power levels are known and the time period in which the mobile station 16 has not entered the reconfirmation mode M2 has reached ten seconds, or the time period in which the mobile station 16 stays in the priority mode M1 has reached five seconds, the mobile station 16 switches to the reconfirmation mode M2.

In the reconfirmation mode M2, the mobile station 16 reconfirms synchronization to neighbor cells having known BSICs. As shown by the arrow 220, when the mobile station 16 completes the reconfirming step of the reconfirmation mode M2, if in the six neighbor cells corresponding to the six strongest receiving power levels, at least one (i.e. one or more) neighbor cell having unknown BSICexists, the mobile station 16 switches to the priority mode M1.

As shown by the arrow 230, when the mobile station 16 completes the reconfirming step of the reconfirmation mode M2, if all BSICs of six neighbor cells corresponding to the six strongest receiving power levels are known, the mobile station 16 switches to the second priority mode M3. In the second priority mode M3, if the BSIC of at least one neighbor cell corresponding to at least one stronger receiving power level other than the six strongest receiving power levels is unknown, the mobile station 16 performs frequency correction and synchronization of the mobile station 16 with respect to the at least one neighbor cell's BCCH to decode the at least one neighbor cell's BSIC. Please note, the at least one neighbor cell mentioned above can be the neighbor cell having the seventh strongest receiving power level. If the at least one neighbor cell includes a plurality of neighbor cells, the at least one neighbor cell mentioned above represents the neighbor cells having the seventh strongest receiving power level, the eighth strongest receiving power level, the ninth strongest receiving power level, . . . , etc.

As shown by the arrow 240, when all monitored neighbor cells' BSICs are known, the mobile station 16 switches to the reconfirmation mode M2.

As shown by the arrow 250, if in the six neighbor cells corresponding to the six strongest receiving power levels, at least one (i.e. one or more) neighbor cell having unknown BSICexists, the mobile station 16 enters the priority mode M1.

As shown by the arrow 260, if all BSICs of six neighbor cells corresponding to the six strongest receiving power levels are known and the time period in which the mobile station 16 has not entered the reconfirmation mode M2 has not reached ten seconds, the mobile station 16 switches to the second priority mode M3.

In this embodiment, the wireless communication system 10 follows the Global System for Mobile communication (GSM) specification, the General Packet Radio Service (GPRS) specification, or derivatives of the GSM/GPRS specification. The frequency correction and synchronization mentioned above are performed according to frame information of frames F of the Frequency Correction Burst and frames S of the Synchronization Burst in a multiframe for transmitting frame information related to the Frequency Correction Burst and the Synchronization Burst, respectively. The above-mentioned monitoring step of the neighbor cells by the mobile station 16 includes monitoring receiving power levels of a plurality of neighbor cells of the wireless communication system 10 according to the latest information in the BCCH Allocation List (BA List) of a serving cell of the wireless communication system 10. According to the present invention, one of the receiving power levels is the carrier power level of the BCCH of the corresponding neighbor cell. In particular, in this embodiment, all the receiving power levels are the carrier power levels of the BCCHs of the corresponding neighbor cells.

In addition, if the reason why the mobile station 16 switches to the reconfirmation mode M2 from the priority mode M1 (i.e. the arrow 210) is that the time period in which the mobile station 16 stays in the priority mode M1 has reached five seconds, the mobile station 16 will switch to the priority mode M1 from the reconfirmation mode M2 (i.e. the arrow 220) after completing the reconfirmation step. If in the six neighbor cells corresponding to the six strongest receiving power levels, at least one (i.e. one or more) neighbor cell having unknown BSICexists, the mobile station 16 only switches between the priority mode M1 and the reconfirmation mode M2 in every time period up to ten seconds.

Furthermore, if all BSICs of six neighbor cells corresponding to the six strongest receiving power levels are known, the mobile station 16 only switches between the reconfirmation mode M2 and the second priority mode M3. As shown by the arrow 230, when the mobile station 16 completes the reconfirming step of the reconfirmation mode M2, if all BSICs of six neighbor cells corresponding to the six strongest receiving power levels are known, the mobile station 16 switches to the second priority mode M3. As shown by the arrow 240, when all monitored neighbor cells' BSICs (including all BSICs of six neighbor cells corresponding to the six strongest receiving power levels) are known or the time period in which the mobile station 16 has not entered the reconfirmation mode M2 has reached ten seconds, the mobile station 16 switches to the reconfirmation mode M2.

According to those described above, while providing the control method of the mobile station 16, the present invention further provides the mobile station 16 executing the control method and a control circuit of the mobile station 16, both capable of reducing the call dropped rate of the mobile station 16 in the wireless communication system 10. The control circuit includes: a first module for monitoring receiving power levels of a plurality of neighbor cells of the wireless communication system 10 according to the information of a serving cell of the wireless communication system 10; and a second module coupled to the first module. If the BSICs of the six neighbor cells corresponding to the six strongest receiving power levels are known, and if the BSIC of at least one neighbor cell corresponding to at least one receiving power level other than the six strongest ones is unknown, the second module makes the first module perform frequency correction and synchronization of the mobile station 16 with respect to the at least one neighbor cell's BCCH to decode the at least one neighbor cell's BSIC. Similarly, if one receiving power level of a neighbor cell is stronger than others, the frequency correction and synchronization of the mobile station 16 with respect to the neighbor cell's BCCH will be performed first. In the first embodiment, the control circuit of the mobile station 16 utilizes the lower layer 20 to monitor the receiving power levels. Wherein the lower layer 20 can be the hardware 20 of the mobile station 16 or the physical layer 20 of the mobile station 16. That is, in the first embodiment, the first module is the lower layer 20. In addition, while the implementation of the present invention is not hindered, a variation of the first embodiment can be implemented utilizing the upper layer 22 of the mobile station 16 to perform related control. That is, in this variation of the first embodiment, the second module is the upper layer 22, wherein the upper layer 22 is defined as all related control components in the mobile station 16 except the lower layer 20. As mentioned above, the mobile station 16 monitors receiving power levels of the neighbor cells according to the latest information in the BA List of the serving cell. Every 0.5 seconds, the lower layer 20 sends the latest measurement result of the neighbor cells that are monitored to the upper layer 22. According to a second embodiment of the present invention, the first module includes the lower layer 20 of the mobile station 16 and a first portion of the upper layer 22 of the mobile station 16, and the second module is a state machine installed in the upper layer 22. In the second embodiment, the upper layer 22 consists of the state machine and the first portion. In addition, according to a third embodiment of the present invention, the first and second modules are components of the lower layer 20 of the mobile station 16.

In the wireless communication system 10 mentioned above, there includes a plurality of cells such as the serving cell and the neighbor cells mentioned above. Each of the cells is provided with communication service by a base station. For simplicity, only a single cell 12 is illustrated as an example in FIG. 1, wherein the cell 12 is provided with communication service by the base station 14. As the plurality of cells are usually adjacent to one another having a honeycomb structure, this kind of wireless communication system is usually referred to as a cellular wireless communication system.

Although the plurality of cells are usually adjacent to one another having a honeycomb structure, this is not a limitation to the present invention. In another embodiment of the present invention, the plurality of cells have no need to be adjacent to one another having a honeycomb structure. In related descriptions of the present invention, the names such as the cell 12, the serving cell mentioned above, the neighbor cells mentioned above, . . . , etc. do not limit the shapes of the cells.

Accordingly, in contrast to the related art, the present invention increases the number of the neighbor cells having known BSIC through switching the mobile station 16 to the second priority mode M3, so that the wireless communication system is capable of selecting a neighbor cell having better communication quality from more selectable neighbor cells and is capable of preventing the mobile station from lack of selectable neighbor cells. Therefore, the present invention enhances the communication quality of the mobile station and reduces the call dropped rate of the mobile station in the wireless communication system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control method capable of reducing a call dropped rate of a mobile station in a wireless communication system, the control method comprising:

monitoring receiving power levels of a plurality of neighbor cells of the wireless communication system according to an information of a serving cell of the wireless communication system;

the mobile station reconfirming the synchronization of the mobile station with respect to the BCCHs of neighbor cells having known BSICs in response to Base Station Identification Codes (BSICs) of the six neighbor cells corresponding to the six strongest receiving power levels being known; and entering a second priority mode for performing frequency correction and synchronization of the mobile station with respect to at least one neighbor cell's Broadcast Control Channel (BCCH) to decode the at least one neighbor cell's BSIC only when the mobile station reconfirming the synchronization of the mobile station with respect to the BCCHs of neighbor cells having known BSICs is completed, wherein the at least one neighbor cell corresponds to at least one receiving power level other than the six strongest ones.

2. The control method of claim 1, wherein the information is the latest information in the BCCH Allocation List (BA List).

3. The control method of claim 1, wherein one of the receiving power levels is the carrier power level of the BCCH of the corresponding neighbor cell.

4. The control method of claim 1, wherein the wireless communication system is a GSM system or a CPRS system.

5. The control method of claim 1, wherein frequency correction and synchronization of the mobile station with respect to the BCCH of the neighbor cell having the stronger receiving power level is performed first.

6. The control method of claim 1 further comprising:

when all the monitored neighbor cells' BSTCs are known, or the time period, during which the mobile station performs reconfirmation of the synchronization of the mobile station with respect to the BCCHs of the neighbor cells having known BSICs, reaches a predetermined duration, entering a reconfirmation mode to thereby perform a reconfirmation operation to reconfirm the synchronization of the mobile station with respect to the BCCHs of the neighbor cells having known BSICs.

7. The control method of claim 1 further comprising:

when one of the BSICs of the six neighbor cells corresponding to the six strongest receiving power levels is unknown, entering a first priority mode for performing frequency correction and synchronization of the mobile station with respect to the unknown neighbor cell's BCCH to decode the neighbor cell's BSIC.

8. A control circuit capable of reducing the call dropped rate of a mobile station in a wireless communication system, the control circuit comprising:

a first module for monitoring receiving power levels of a plurality of neighbor cells of the wireless communication system according to an information of a serving cell of the wireless communication system; and a second module coupled to the first module, wherein the mobile station reconfirms the synchronization of the mobile station with respect to the BCCHs of neighbor cells having known BSICs in response to the Base Station Identification Codes (BSICs) of the six neighbor cells corresponding to the six strongest receiving power levels being known, and the second module enters a second priority mode for making the first module perform frequency correction and synchronization of the mobile station with respect to at least one neighbor cell's BOCH to decode the at least one neighbor cell's BSIC only when the mobile station reconfirming the synchronization of the mobile station with respect to the BCCHs of neighbor cells having known BSICs is completed, wherein the at least one neighbor cell corresponds to at least one receiving power level other than the six strongest ones.

9. The control circuit of claim 8, wherein the information is the latest information in the BCCH Allocation List (BA List).

10. The control circuit of claim 8, wherein the first module is a lower layer of the mobile station, and the second module is an upper layer of the mobile station.

11. The control circuit of claim 8, wherein the first module comprises a lower layer and a first portion of an upper layer of die mobile station, and the second module is a state machine installed in the upper layer.

12. The control circuit of claim 11, wherein the upper layer consists of the state machine and the first portion.

13. The control circuit of claim 8, wherein the first and second modules are components of a lower layer of the mobile station.

14. The control circuit of claim 8, wherein one of the receiving power levels is the carrier power level of the BCCH of the corresponding neighbor cell.

15. The control circuit of claim 8, wherein the wireless communication system is a GSM system or a GPRS system.

16. The control circuit of claim 8, wherein frequency correction and synchronization of the mobile station with respect to the BCCH of the neighbor cell having the stronger receiving power level is performed first.

17. The control circuit of claim 8, wherein when all the monitored neighbor cells'BSICs are known, or the time period, during which the mobile station performs reconfirmation of the synchronization of the mobile station with respect to the BCCHs of the neighbor cells having known BSICs, reaches a predetermined duration, the second module enters a reconfirmation mode to make the first module reconfirm the synchronization of the mobile station with respect to the BCCHs of the neighbor cells having known BSICs.

18. The control circuit of claim 8, wherein when one of the BSICs of the six neighbor cells corresponding to the six strongest receiving power levels is unknown, the second module enters a first priority mode to make the first module perform the frequency correction and synchronization of the mobile station with respect to the unknown neighbor cell's BCCH to decode the neighbor cell's BSIC.

19. A mobile station comprising:
an antenna, for transmitting and receiving wireless communication signals;
a first module, coupled to the antenna, for monitoring receiving power levels of a plurality of neighbor cells of the wireless communication system according to an information of a serving cell of the wireless communication system; and
a second module, coupled to the first module, wherein the mobile station reconfirming the synchronization of the mobile station with respect to the BCCHs of neighbor cells having known BSICs in response to the the Base Station Identification Codes (BSICs) of the six neighbor tells corresponding to the six strongest receiving power levels being known, and the second module enters a second priority mode for making the first module perform frequency correction and synchronization of the mobile station with respect to at least one neighbor cell's BCCH to decode the at least one neighbor cell's BSIC only when the mobile station reconfirming the synchronization of the mobile station with respect to the BCCHs of neighbor cells having known BSICs is completed, wherein the at least one neighbor cell corresponds to at least one receiving power level other than the six strongest ones.

20. The mobile station of claim 19, wherein the information is the latest information in the BCCH Allocation List (BA List).

21. The mobile station of claim 19, wherein one of the receiving power levels is the carrier power level of the BCCH of the corresponding neighbor cell.

22. The mobile station of claim 19, wherein the wireless communication system is a GSM system or a GPRS system.

23. The mobile station of claim 19, wherein frequency correction and synchronization of the mobile station with respect to the BCCH of the neighbor cell having the stronger receiving power level is performed first.

24. The mobile station of claim 19, wherein when all the monitored neighbor cells'BSICs are known, or the time period, during which the mobile station performs reconfirmation of the synchronization of the mobile station with respect to the BCCHs of the neighbor cells having known BSICs, reaches a predetermined duration, the second module enters a reconfirmation mode to make the first module reconfirm the synchronization of the mobile station with respect to the BCCHs of the neighbor cells having known BSICs.

25. The mobile station of claim 19, wherein when one of the BSICs of the six neighbor cells corresponding to the six strongest receiving power levels is unknown, the second module enters a first priority mode to make the first module perform the frequency correction and synchronization of the mobile station with respect to the unknown neighbor cell's BCCH to decode the neighbor cell's BSIC.

26. The control method of claim 1, wherein monitoring receiving power levels of the plurality of neighbor cells is performed every first predetermined time period.

27. The control method of claim 6, wherein entering the reconfirmation mode to thereby perform the reconfirmation operation to reconfirm the synchronization of the mobile station with respect to the BCCHs of the neighbor cells having known BSICs is performed every second predetermined time period.

28. The control method of claim 7, wherein entering the first priority mode for performing frequency correction and synchronization of the mobile station with respect to the unknown neighbor cell's BCCH to decode the neighbor cell's BSIC is predetermined every third predetermined time period.

29. The control circuit of claim 8, wherein the first module monitors receiving power levels of the plurality of neighbor cells every first predetermined time period.

30. The control circuit of claim 17, wherein the second module enters the reconfirmation mode to make the first module reconfirm synchronization of the mobile station with respect to the BCCHs of the neighbor cells having known BSICs every second predetermined time period.

31. The control circuit of claim 18, wherein the second module enters the first priority mode to make the first module perform the frequency correction and synchronization of the mobile station with respect to the unknown neighbor cell's BCCH to decode the neighbor cell's BSIC every third predetermined time period.

32. The control circuit of claim 19, wherein the first module monitors receiving power levels of the plurality of neighbor cells every first predetermined time period.

33. The control circuit of claim 24, wherein the second module enters the reconfirmation mode to make the first module reconfirm synchronization of the mobile station with respect to the BCCHs of the neighbor cells having known BSICs every second predetermined time period.

34. The control circuit of claim 25, wherein the second module enters the first priority mode to make the first module perform the frequency correction and synchronization of the mobile station with respect to the unknown neighbor cell'BCCH to decode the neighbor cell's BSIC every third predetermined time period.

* * * * *